March 19, 1968    C. J. BURBANK ET AL    3,373,842
UNDERWATER ANECHOIC CHAMBER WITH SCREEN OF RUBBERLIKE TUBES
Filed Aug. 28, 1967    2 Sheets-Sheet 1

INVENTORS
CECIL J. BURBANK
FRANK R. ABBOTT
BY
ATTORNEYS

INVENTORS
CECIL J. BURBANK
FRANK R. ABBOTT
BY
ATTORNEYS

United States Patent Office 3,373,842
Patented Mar. 19, 1968

3,373,842
UNDERWATER ANECHOIC CHAMBER WITH SCREEN OF RUBBERLIKE TUBES
Cecil J. Burbank and Frank R. Abbott, San Diego, Calif., assignors to the United States of America as represented by the Secretary of the Navy
Filed Aug. 28, 1967, Ser. No. 664,239
4 Claims. (Cl. 181—33)

ABSTRACT OF THE DISCLOSURE

Sound transducers cannot generally be tested in a small pool of water because of reverberations caused by echoes from the side walls or boundaries of the pool. Near ideal anechoic conditions are achieved in this invention by mounting a screen of air-filled rubber tubes parallel to the top, bottom and sides of the pool.

The invention described herein may be manufactured and used by or for the Government of the United States of America for governmental purposes without the payment of any royalties thereon or therefor.

Background

The reflections of acoustic energy from the walls of a chamber have been minimized by covering the walls with various resilient absorption materials as well as by non-resilient conical or prismoidal lens structures. Usually such structures are expensive and are particularly difficult to apply to the interior of containers which must be filled with water.

The object of this invention is to provide an improved sound absorption structure.

A more specific object of this invention is to provide an anechoic pool with a sound absorption structure which can be inexpensively applied to the interior walls of a container.

Summary

The sound absorption structure of this invention is a screen of parallel tubes of soft rubberlike material, the tubes being inflated with air at a pressure sufficient to prevent collapse of the tubes in water at the depth of operation. The tubes of the screen are spaced apart about ⅙ of the shortest expected acoustic wavelength, whereas the distance of each screen from the adjacent container wall is equal to or less than about ¼ wavelength of the shortest expected wavelength.

Other objects and features of this invention will become apparent to those skilled in the art by referring to the specific embodiments described in the following specification and shown in the accompanying drawing in which.

Figure 1:
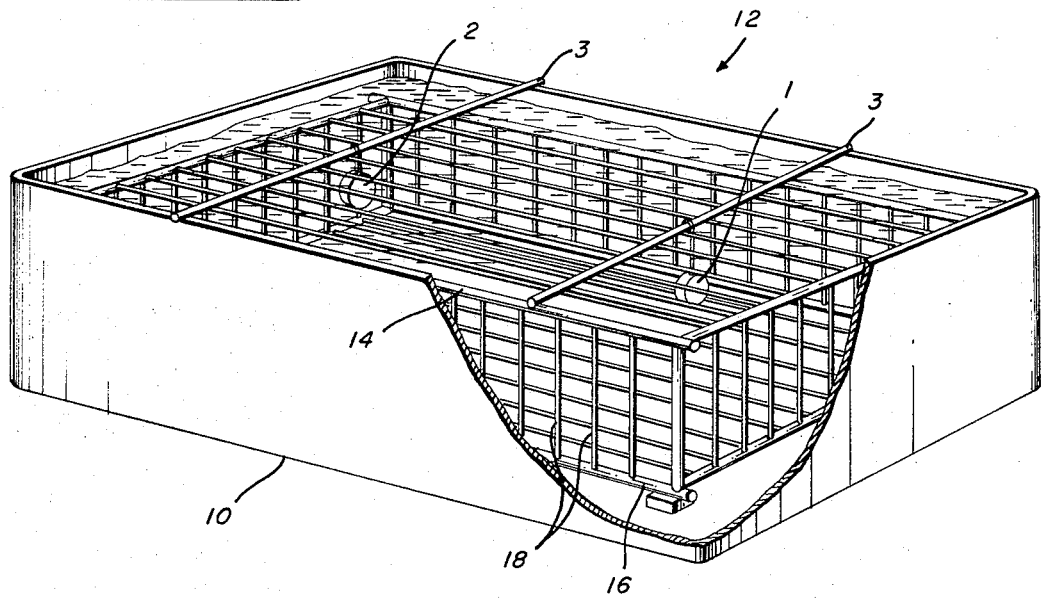
FIG. 1 is a perspective view of a water-tight container containing the screens of this invention.

In FIG. 1 is shown the tank 10 adapted to contain a body of water of a sufficient size to accommodate the transmitting transducers and hydrophones to be tested. The depth of the tank is sufficient to completely submerge the largest transducer to be tested and the length of the tank is sufficient to space, an optimum distance, the receiving hydrophone from the transmitting transducer. Conveniently, the transducer 1, FIG. 1, and the hydrophone 2 may be suspended from bars 3 laid across the tank. While the sidewalls of the tank may be of sheet material as suggested in FIG. 1, with relatively yieldable sides, the tank may be of concrete with substantially immovable sides.

According to this invention, the bottom and side walls of the tank are covered with a screen. In addition a screen is submerged just below and parallel to the top surface of the water. This means that in a four-sided tank, there should be six screens. Each panel of the screen preferably comprises two parallel bars or pipes 14 and 16 between which is lightly tautened parallel tubes 18. Various modes of attachment of the tubes to the pipe 16 may be employed. As suggested in FIG. 2 each end of each tube is slip-fitted to a nipple 20. The nipples are aligned along the side of the pipe 16. Where the hydrostatic pressure may be great enough to collapse the tubes 18, it is preferred that the pipe 16 be hollow and be connected to an external source of air pressure. The pipe 16, now serving as a manifold for all of the attached tubes, can be maintained at any suitable pressure. If the tube appears to flatten when submerged a slight air pressure is applied.

The tubes 18 are of rubber-like material and may be of pure soft rubber or rubber substitutes such as polyvinyl chloride or of other suitable soft plastics. In selecting the material of the tubes, maximum yieldability is the decideratum. Commercially obtainable soft rubber tubes are to be had with a quarter inch outside diameter and with about ½₂-inch thick walls.

Figure 2:
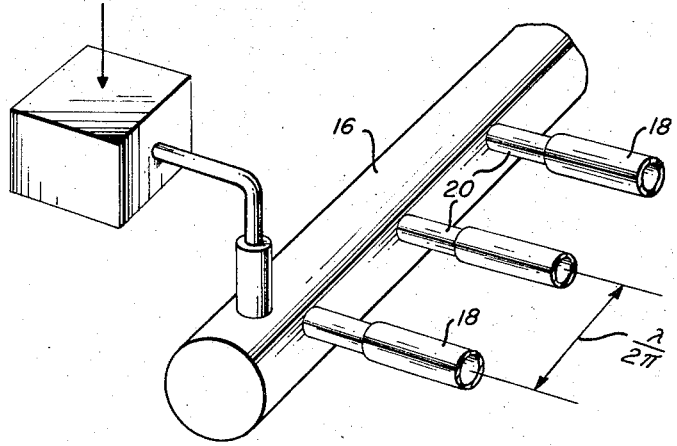
FIG. 2 is a view in perspective of a detail of one portion of the screen employed in FIG. 1.
Figure 3:
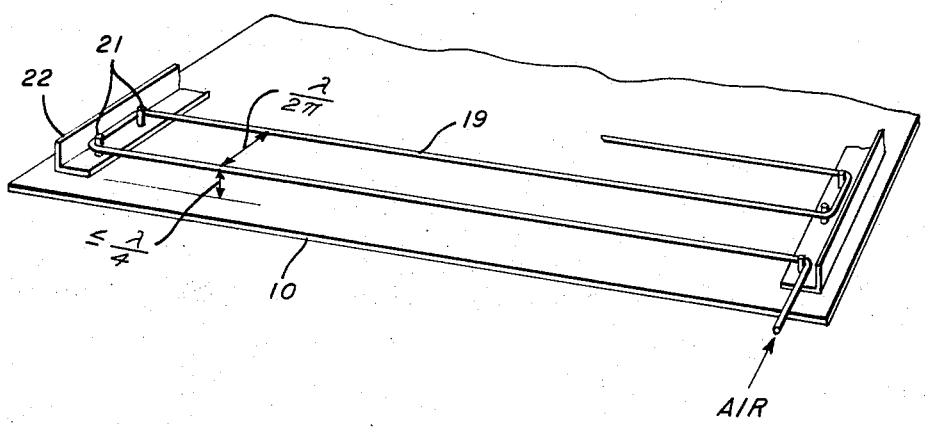
FIG. 3 is a detail of an alternative structure employable in constructing the screens of FIG. 1.
Figure 4:
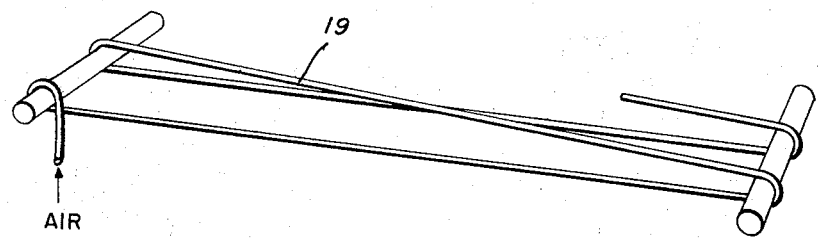
FIG. 4 is a third alternative of the screen structure of this invention.

Instead of manifolds as shown at 16 in FIG. 2, a continuous length of the tubing 19 may be woven over pegs 21 on a framework 22 as shown in FIG. 3 with one end of the tubing brought out to an external air source. The third alternative, shown in FIG. 4, comprises the rubber tubing wound about the spaced round rods. Here again the one end of the tubing is brought out for attachment to an external source of air pressure.

The dimensions of the screens with respect to the internal dimensions of the tank are so adjusted that, preferably, the screens can be mounted about one quarter of a wavelength from the adjacent tank wall. The spacing between parallel tubes in each screen is most effective if about $\lambda/2\pi$. That is, the spacing between tubes should be about ⅙ of the wavelength of the highest frequency to be employed in the tank.

Physically what transpires is this—first, a deformation of configuration from round to oval occurs, and then the tubes rebound back to round as the pressure or dilatation of a wave passes through the screen. The viscous loss in the material converts deformation energy into heat. Where the wall of the tank behind the screen is sheets of metal as suggested in FIG. 1 the untreated reflection coefficient of the wall is near unity, in which case the wall is displaced by the sound wave and the wave reflects with phase reversal. In this case, the screen will give best results when about one quarter wavelength from the wall. If however the wall is inflexible as in a concrete tank, then the reflected wave suffers no phase reversal and the tubing screen is most effective when close to the wall.

Figure 5:
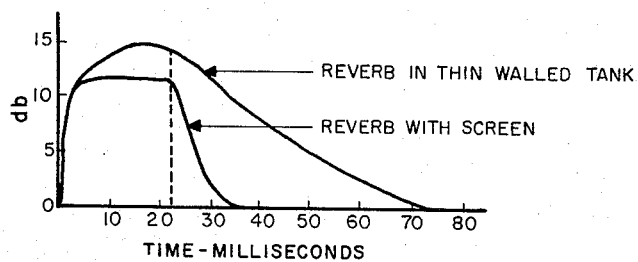
FIG. 5 is a graph of the reverberation in a tank with and without the screen of this invention.

In FIG. 5 is shown an oscillogram of the reverberations in a thin-walled rectangular tank without the rubber-tube screens. The reverberation characteristics after covering all walls with screens is also shown. The empirical results here shown indicate attenuation in reverberation level of about 2,000 decibels per second. This corresponds to roughly 20 db loss each time the wave passed through the screen. It is to be noted that at the termination of the power pulse from the transmitting transducer, which occurs at the point in time shown as 22 on the time scale of FIG. 5, the reverberation level with the screens drops to zero within about 10 milliseconds. In the same tank without screens, reverberation persists for about 50 milliseconds.

Obviously many modifications and variations of the present invention are possible in the light of the above teachings. It is therefore to be understood that within the scope of the appended claims the invention may be practiced otherwise than as specifically described.

What is claimed is:

1. An underwater anechoic chamber for testing transmitting transducers and receiving hydrophones, said chamber comprising;
   a container with bottom and side walls defining the boundaries of a pool of water, and
   sound absorbing screens positioned in said container over the mentioned bottom and side walls,
   each screen consisting of substantially parallel air-filled tubes of rubberlike material, the material of the tubes being sufficiently pliable to be deformed by the sound waves of said transducer yet stiff enough to not collapse at the hydrostatic pressure of greatest depth of submergence in said water, and said parallel tubes being spaced apart about 1/6 of the shortest wavelength of said sound waves.

2. In the anechoic chamber defined in claim 1;
   each of said screens being spaced from the adjacent wall of the container a distance less than about 1/4 wavelength of said sound waves.

3. The anechoic chamber defined in claim 1 further comprising;
   a screen of parallel air-filled tubes of rubberlike material, said screen being spaced above the bottom screen to defined the upper boundary of said anechoic chamber.

4. In the anechoic chamber defined in claim 1, said screen comprising;
   a frame with spaced parallel bars and with parallel lengths of said tubes tautened between said bars, and
   air compressing means communicating with said lengths of tubes for inflating said tubes to prevent collapse when submerged.

References Cited

UNITED STATES PATENTS

| | | | |
|---|---|---|---|
| 1,378,420 | 5/1921 | Merritt | 181—33.4 |
| 1,520,291 | 12/1924 | Hahnemann | 181—.5 |
| 2,891,232 | 6/1959 | Beneche | 181—.5 |
| 3,102,246 | 8/1963 | Honey et al. | 181—33.4 |
| 3,212,602 | 10/1965 | Jones et al. | 181—47.1 |

ROBERT S. WARD, JR., *Primary Examiner.*